United States Patent
Tei et al.

(10) Patent No.: US 6,939,595 B2
(45) Date of Patent: Sep. 6, 2005

(54) MAGNETIC RECORDING MEDIUM SUBSTRATE USING THERMOPLASTIC ALLYLOXYMETHYLSTYRENE RESIN, MAGNETIC RECORDING MEDIUM USING THE SUBSTRATE, AND METHOD OF MANUFACTURING THE MAGNETIC RECORDING MEDIUM

(75) Inventors: Youichi Tei, Nagano (JP); Kouichi Tsuda, Nagano (JP); Ryoji Kobayashi, Nagano (JP); Syoji Sakaguchi, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 53 days.

(21) Appl. No.: 10/712,720

(22) Filed: Nov. 13, 2003

(65) Prior Publication Data

US 2004/0151948 A1 Aug. 5, 2004

(30) Foreign Application Priority Data

Nov. 14, 2002 (JP) ........................................ 2002-331198

(51) Int. Cl.[7] .................................................. G11B 5/73
(52) U.S. Cl. ................. 428/64.2; 428/523; 428/694 SL
(58) Field of Search ........................... 428/64.2, 694 SL, 428/523

(56) References Cited

U.S. PATENT DOCUMENTS 6,333,089 B1 * 12/2001 Hirata et al. ................ 428/64.1

FOREIGN PATENT DOCUMENTS

| JP | 7-153060 A | 6/1995 |
| JP | 7-210855 A | 8/1995 |
| JP | 9-85743 A | 3/1997 |

OTHER PUBLICATIONS

Butler, George B., "Radical cyclo– and cyclopolymerization", Journal of Polymer Science, Polymer Symposia (1978)p. 71–93.*

* cited by examiner

Primary Examiner—Stevan A. Resan
(74) Attorney, Agent, or Firm—Rossi, Kimms & McDowell

(57) ABSTRACT

An injection molded thermoplastic magnetic recording substrate a medium formed therewith, and a method thereof is composed of a thermoplastic or allyloxymethylstyrene type resin.

26 Claims, 1 Drawing Sheet

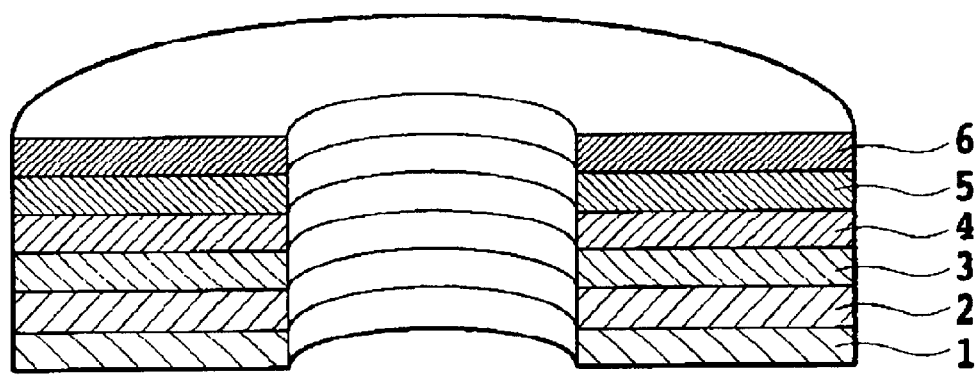

MAGNETIC RECORDING MEDIUM SUBSTRATE USING THERMOPLASTIC ALLYLOXYMETHYLSTYRENE RESIN, MAGNETIC RECORDING MEDIUM USING THE SUBSTRATE, AND METHOD OF MANUFACTURING THE MAGNETIC RECORDING MEDIUM

BACKGROUND

As the capacity of recording apparatuses using magnetic recording media increases, efforts have been made to reduce the magnetic head flying height so that the recording density can be increased. To reduce the magnetic head flying height, a magnetic recording medium having excellent smoothness, i.e., a magnetic recording medium having high surface precision is required. For example, in the case of non-magnetic metal (i.e., Al, etc.) substrates that have been widely used in the past, high precision machining is required.

Following is an example of a method of manufacturing a magnetic recording medium substrate comprising a conventional non-magnetic metal substrate, and a magnetic recording medium using that substrate. For the non-magnetic metal substrate, in general a blank is obtained by subjecting a heated molten metal material to rolling and hot annealing, and then machining to prescribed. The blank is subjected to inside/outside diameter processing, and lapping is carried out to improve the surface precision. After that, a 13 $\mu$m Ni—P plating layer is formed on the blank to improve the surface hardness and so on. The surface of the Ni—P plating layer is polished to a surface roughness Ra of 10 Å, and then the polished surface is subjected to final lapping using a diamond slurry. The substrate obtained is subjected to laser zone texturing such that, for example, the bump height becomes 190 Å and the bump density becomes 30×30 in a contact start/stop (CSS) zone. Next, the substrate is subjected to precision cleaning, thus obtaining a magnetic recording medium substrate.

A 500 Å Cr foundation layer, a 300 Å Co-14Cr-4Ta magnetic layer, and an 80 Å carbon protective layer are formed in this order by DC sputtering on the magnetic recording medium substrate. After the sputtering, the surface is subjected to tape burnishing, and then a 20 Å fluorinated lubricant layer is formed by dip coating or spin coating to form a finished magnetic recording medium.

The conventional method of manufacturing a magnetic recording medium substrate and a magnetic recording medium described above has become more complicated in recent years, accompanying demands for further increases in recording density. Furthermore, there are also demands to provide magnetic recording media that are cheaper than conventional ones and yet still give a higher performance. Magnetic recording media in which a thermoplastic resin is used for the magnetic recording medium substrate have been proposed as magnetic recording media for meeting these demands.

A method where a plastic magnetic recording medium substrate is manufactured using a molding technique, and a CSS zone and an undulating pattern that serves as a preform for servo marks on the magnetic recording medium are formed simultaneously during the molding gives excellent productivity and is industrially favorable, and magnetic recording media can be provided inexpensively. For example, Japanese Patent Application Laid-open No. 7-153060 (paragraphs 0009 to 0010) discloses a magnetic recording medium substrate that is formed by injection molding a thermoplastic norbornene type resin and having an optimized thickness, and a prescribed shape on the surface thereof.

Moreover, as another example, Japanese Patent Application Laid-open No. 7-210855 (paragraphs 0009 to 0010) discloses a magnetic recording medium obtained by injection molding a magnetic disk substrate from a filler-containing plastic composite material for which the types and contents of the filler and the matrix resin, the particle diameter of the filler, the thickness of the magnetic disk substrate and so on have been optimized, and then providing a magnetic layer on the substrate.

Furthermore, as another example, Japanese Patent Application Laid-open No. 9-85743 (paragraph 0005) discloses a method of obtaining a molded article, especially a substrate used in a magnetic recording medium, having excellent surface precision by injection molding a thermoplastic norbornene type resin at a prescribed temperature and over a prescribed time, and the molded article obtained.

A plastic magnetic recording medium substrate manufactured by, for example, injection molding synthetic resin pellets, when compared with a metallic substrate or a ceramic substrate made of glass or the like, the mechanical strength properties, such as tensile strength and the tensile and bend elastic moduli, are generally poor. Hence, there are problems, such as the flatness of the substrate dropping due to stress arising during molding or release of the substrate from the mold, undulating defects of magnitude several $\mu$m arising, and the minute waviness becoming large, associated with injected molded substrates. Furthermore, when the plastic magnetic recording medium substrate has a high coefficient of thermal expansion, shape change will occur at a high-temperature environment. Furthermore, in the case of a highly hygroscopic substrate, the change in shape will be further promoted. These conditions create obstacles for forming a magnetic recording medium substrate that is required to have high surface precision.

If a magnetic recording medium is manufactured using a magnetic recording medium substrate having surface defects, reduced flatness, and large minute waviness, then reading and writing with the head may not be possible, and in particular during continuous or high speed seeking using a head with a low flying height, the traveling of the head will become unstable, leading ultimately to head crashes, and reliability issues.

Moreover, even when a plastic magnetic recording medium substrate has prescribed shape properties and surface precision, under a high-temperature, high-humidity environment (e.g., 500 hours at 80° C. and 80% relative humidity (RH)), the change in shape of the substrate will increase, leading again to the problems described above.

The plastic magnetic recording medium substrate can be formed with a polycarbonate resin, a polymethyl methacrylate resin or the like, and a thermoplastic norbornene type resin. However, polycarbonate resins and polymethyl methacrylate resins used for optical disk substrates deform through moisture absorption or heat, making it unsuitable. Moreover, although a thermoplastic norbornene type resin has relatively good properties with regard to heat resistance, hygroscopicity, and shape stability, such a resin again has problems described above.

Accordingly, there is a need for a plastic magnetic recording substrate that has good mechanical properties suitable for a high density magnetic recording medium. The present invention addresses this need.

SUMMARY OF THE INVENTION

The present invention relates to an injection molded thermoplastic magnetic recording medium substrate, a magnetic recording medium using the substrate, and a method of manufacturing the magnetic recording medium thereof. In particular, the present injection molded plastic substrate for a magnetic recording medium is particularly suitable in any of various digital data magnetic recording application, such as an external memory for a computer, a magnetic recording medium using the substrate.

One aspect of the present invention is an injection molded plastic magnetic recording medium substrate comprising a thermoplastic allyloxymethylstyrene type resin having either or both of a structural unit represented by general formula A and a structural unit represented by general formula B identified below, where R is a group selected from hydrogen, alkyl groups, cycloalkyl groups, aryl groups and aromatic heterocyclic groups, and m and n each represent 0 or an integer of 1 or higher, with the proviso that m and n are not both 0.

The thermoplastic allyloxymethylstyrene type resin can include a thermoplastic phenylallyloxymethylstyrene resin having either or both of a structural unit represented by general formula 1 and a structural unit represented by general formula 2 identified below or a thermoplastic allyloxymethylstyrene resin having either or both of a structural unit represented by general formula 3 and a structural unit represented by general formula 4 identified below, where m and n each represent 0 or an integer of 1 or higher, with the proviso that m and n are not both 0.

The thermoplastic phenylallyloxymethylstyrene resin can have a cyclization rate of at least 90%, a glass transition temperature (Tg) in a range of 180° C. to 270° C., a thermal decomposition point of at least 360° C., and a moisture content of not more than 0.01%. The thermoplastic allyloxymethylstyrene resin can have a cyclization rate of at least 80%, a glass transition temperature (Tg) of at least 100° C., a thermal decomposition point of at least 350° C., and a moisture content of not more than 0.01%.

The substrate can have a flatness in a surface radial direction not more than 12 µm, a straightness not more than 1.2 µm, a waviness (Wa) not more than 50 nm, and an average roughness (Ra) not more than 0.5 nm. The substrate has a substrate flatness shape change after exposure for 500 hours to a high-temperature high-humidity environment of 80° C. and 80% RH not more than 10%.

Another aspect of the present invention is a magnetic recording medium comprising the substrate described above and at least a magnetic layer, a protective layer, and a lubricant layer formed on the substrate.

Another aspect of the present invention is a method of manufacturing the magnetic recording medium described above by forming the substrate described above by thoroughly drying the thermoplastic allyloxymethylstyrene type resin, such as the thermoplastic phenylallyloxymethylstyrene or allyloxymethylstyrene resin described above, and then injection molding the thermoplastic allyloxymethylstyrene type resin, and thereafter, forming at least the magnetic layer, the protective layer, and the lubricant layer described above in this order on the substrate.

BRIEF DESCRIPTION OF THE DRAWINGS

The FIGURE is schematic sectional view of a magnetic recording medium according to the present invention.

DETAILED DESCRIPTION

The present inventors carried out assiduous studies to resolve the problems identified above, and as a result ascertained that it was impossible to resolve all of the above problems using an existing plastic material, and thus that it was necessary to use a novel plastic material having a high glass transition temperature Tg, high thermal stability, excellent shape stability, excellent moisture resistance, and sufficient fluidity for injection molding. From this standpoint, the present inventors invented novel thermoplastic allyloxymethylstyrene type resins, in particular novel thermoplastic phenylallyloxymethylstyrene resins and novel thermoplastic allyloxymethylstyrene resins.

First, an outline description of the thermoplastic allyloxymethylstyrene type resins used in the present invention will be given. A thermoplastic allyloxymethylstyrene type resin used in the present invention has either or both of a repeat structural unit represented by the following general formula A and a repeat structural unit represented by the following general formula B:

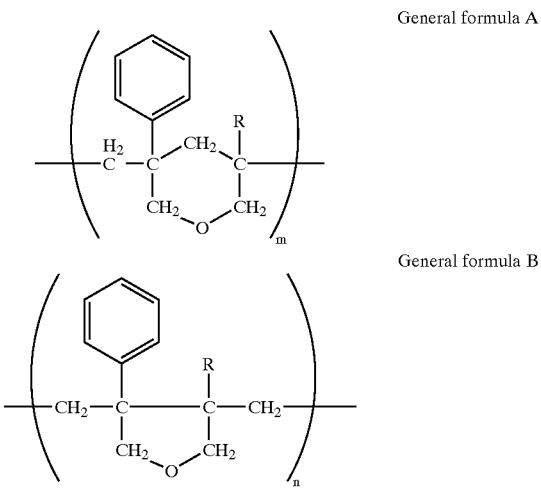

General formula A

General formula B

The repetition number m and n each represent 0 or an integer of 1 or higher, with the proviso that m and n are not both 0. Examples of R can be hydrogen, alkyl groups such as methyl and ethyl, cycloalkyl groups such as cyclopropyl, cyclobutyl, cyclopentyl and cyclohexyl, aryl groups such as phenyl and naphthyl, and aromatic heterocyclic groups such as pyridyl and furyl, although there is no particular limitation thereto. The phenyl group in general formulae A and B can be optionally substituted, so long as the effects of the present invention are still produced. Examples of substitutes include lower alkyl groups such as methyl and ethyl. The thermoplastic allyloxymethylstyrene type resin used in the present invention generally has a number average molecular-weight in a range of 1,500 to 30,000, preferably 2,000 to 25,000, more preferably 3,000 to 20,000.

Preferably, the thermoplastic allyloxymethylstyrene type resin used in the present invention has at least one of a structural unit represented by the following general formula 1, structural unit represented by the following general formula 2, a structural unit represented by the following general formula 3, and a structural unit represented by the following general formula 4.

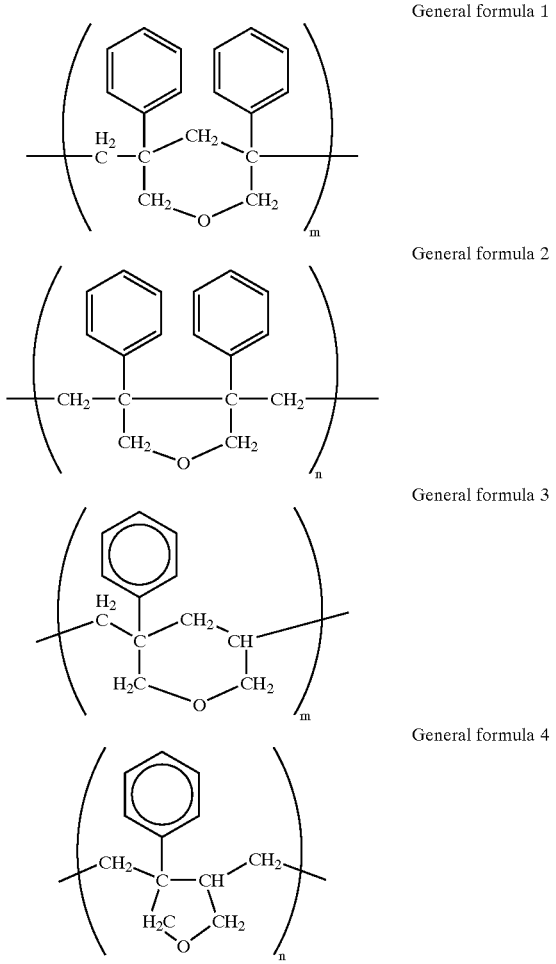

General formula 1

General formula 2

General formula 3

General formula 4

The allyloxymethylstyrene type resin having at least one of the structural unit represented by general formula 1 and the structural unit represented by general formula 2 is referred to as a 'phenylallyloxymethylstyrene resin', and an allyloxymethylstyrene type resin having at least one of the structural unit represented by general formula 3 and the structural unit represented by general formula 4 is referred to as an 'allyloxymethylstyrene resin'. Moreover, in a phenylallyloxymethylstyrene or allyloxymethylstyrene resin containing the structural unit(s) of above-mentioned general formulae 1 to 4 that can be used in the present invention, m and n each represent 0 or an integer of 1 or greater, with the proviso that m and n are not both 0. Moreover, the phenylallyloxymethylstyrene resin or allyloxymethylstyrene resin generally has a number average molecular weight in a range of 1,500 to 30,000, preferably 2,000 to 25,000, more preferably 3,000 to 20,000.

The cyclization rate of the thermoplastic allyloxymethylstyrene type resin, in particular the thermoplastic phenylallyloxymethylstyrene or allyloxymethylstyrene resin, can be controlled through the type and amount of a polymerization initiator during the synthesis, and the polymerization temperature and polymerization time. However, to obtain a glass transition temperature (Tg) and thermal stability suitable for a thermoplastic resin, the cyclization rate of the thermoplastic allyloxymethylstyrene type resin obtained must be at least 80%. Specifically, in the case of a thermoplastic phenylallyloxymethylstyrene resin, the cyclization rate must be at least 90%, preferably at least 99%. Moreover, in the case of a thermoplastic allyloxymethylstyrene resin, the cyclization rate must be at least 80%, preferably at least 88%.

If the cyclization rate of the thermoplastic allyloxymethylstyrene type resin is low, then the repeat units of the polymer will include many un-cyclized pendant olefin structural units, and as a result as the molecular weight of the polymer molecules drops, the glass transition temperature (Tg) and the thermal stability of the thermoplastic resin drop, and furthermore with regard to molded articles obtained by injection molding, problems arise so that it is not possible to obtain a prescribed surface precision, mechanical strength, thermal stability, and shape stability.

The glass transition temperature (Tg) of the thermoplastic allyloxymethylstyrene type resin will vary according to the molecular weight, the cyclization rate and so on, but should be at least 100° C. Specifically, the glass transition temperature (Tg) of the thermoplastic phenylallyloxymethylstyrene or allyloxymethylstyrene resin will vary according to the molecular weight, the cyclization rate and so on. But in the case of a thermoplastic phenylallyloxymethylstyrene resin for which the cyclization rate has been controlled to be at least 90%, Tg is 180° C. to 270° C., preferably 200° C. to 270° C., and in the case of a thermoplastic allyloxymethylstyrene resin for which the cyclization rate has been controlled to be at least 80%, preferably at least 88%, Tg is at least 100° C.; in the present invention, the glass transition temperature (Tg) is preferably in such a range. A molded article obtained by injection molding a thermoplastic phenylallyloxymethylstyrene resin or allyloxymethylstyrene resin having a glass transition temperature in such a range can be made to have sufficient mechanical strength, thermal stability and shape stability, and a prescribed surface precision.

Moreover, the thermal decomposition point of the thermoplastic allyloxymethylstyrene type resin will also vary according to the cyclization rate and so on, but is preferably at least 350° C. More specifically, for example, the thermal decomposition point of the thermoplastic phenylallyloxymethylstyrene or allyloxymethylstyrene resin will vary according to the cyclization rate and so on, but in the case of a thermoplastic phenylallyloxymethylstyrene resin for which the cyclization rate has been controlled to be at least 90%, the thermal decomposition point is at least 360° C., and in the case of a thermoplastic allyloxymethylstyrene resin for which the cyclization rate has been controlled to be at least 80%, preferably at least 88%, the thermal decomposition point is at least 350° C.; in the present invention, the resin preferably has such a thermal decomposition point. With such a resin, degeneration of low-molecular-weight components having poor thermal stability will not occur even under high-temperature melting during injection molding, and hence defects of size several $\mu$m to several tens of $\mu$m will not arise on the surface of a molded article that has been obtained by injection molding, and hence the molded article can be made to have sufficient surface precision.

In the present invention, the thermal decomposition point can be determined, for example, as follows: 5±0.5 mg of the sample is weighed out, and the 0.5% thermal weight loss temperature is measured using a thermogravimetric (TG) analyzer (under $N_2$ (flow rate 200 ml/min), temperature 30 to 600° C. (heating rate, e.g., 10° C./min)).

Moreover, the moisture content of a thermoplastic allyloxymethylstyrene type resin depends greatly on the chemical structure of the resin. A thermoplastic allyloxymethylstyrene type resin of the present invention preferably has a moisture content of not more than 0.01%. For example, thermoplastic phenylallyloxymethylstyrene and allyloxymethylstyrene resins that can be used have no polar functional groups in the structural unit thereof, and moreover have a structure in which three-dimensional cyclic structures, such as cyclic phenylallyloxymethylstyrene structures or cyclic allyloxymethylstyrene structures, are polymerized together, which gives low hygroscopicity, and hence the moisture content of the resin can be kept low. In the case of a thermoplastic phenylallyloxymethylstyrene or allyloxymethylstyrene resin for which the cyclization rate, the thermal decomposition point, the structure, the composition, physical properties, and so on have been controlled as described above, the moisture content can thus be made to be not more than 0.01%. This will mean that with a molded article obtained by injection molding using the resin, for example, there will be no change in shape due to moisture absorption upon carrying out a test on stability to the environment involving leaving in a high-temperature high-humidity environment, and moreover no defects will arise on the surface of the molded article upon carrying out a condensation test involving moving from a high-temperature high-humidity environment to a low-temperature low-humidity environment. As a result, a molded article having high reliability against the environment can be obtained.

The thermoplastic allyloxymethylstyrene type resin according to the present invention, in particular the thermoplastic phenylallyloxymethylstyrene or thermoplastic allyloxymethylstyrene resin, can have any of various additives added thereto, for example aging inhibitors of phenol type, phosphorus type or the like, thermal degradation inhibitors of phenol type or the like, ultraviolet stabilizers of benzophenone type, hindered amine type or the like, antistatic agents of amine type or the like, slip additives of aliphatic alcohol ester type, and so on. Moreover, other resins (e.g., norbornene type polyolefin resins, polycarbonate resins, polymethyl methacrylate resins, etc.) can be mixed in, so long as this is within a range such that the objects of the present invention are not impaired. Moreover, a filler such as titanium dioxide or silicon dioxide can be added with an objective of further improving the mechanical strength.

Regarding properties considered to be necessary for a magnetic recording medium substrate such as heat resistance (thermal stability), moisture resistance, strength and rigidity, and stability to the environment, a thermoplastic allyloxymethylstyrene type resin, in particular a thermoplastic phenylallyloxymethylstyrene or thermoplastic allyloxymethylstyrene resin, containing additives as described above can be regarded as having substantially the same properties as the thermoplastic allyloxymethylstyrene type resin to which these additives have not been added, since the amounts added of the additives are low.

A description will now be given of a plastic magnetic recording medium substrate according to the present invention. The plastic magnetic recording medium substrate of the present invention is formed by injection molding using a thermoplastic allyloxymethylstyrene type resin, in particular a thermoplastic phenylallyloxymethylstyrene or thermoplastic allyloxymethylstyrene resin, as described above. It is preferable to dry the thermoplastic allyloxymethylstyrene type resin before being injection molded, thus sufficiently removing substances contained therein, for example atmospheric gases dissolved therein such as $N_2$, $O_2$ and $H_2O$, low-molecular-weight allyloxymethylstyrene type resin, e.g., low-molecular-weight phenylallyloxymethylstyrene resin or low-molecular-weight allyloxymethylstyrene resin, impurities from the synthesis, and so on.

As a drying method, vacuum drying can be used alone, or normal pressure drying and vacuum drying can be used in combination. The pressure in the vacuum drying is preferably not more than 20 Pa, the drying temperature is preferably 80 to 150° C., and the drying time is preferably 12 to 48 hours, although there is no limitation to these ranges in the present invention. Moreover, the normal pressure drying can be carried out in air or in an $N_2$ atmosphere. Through the drying process, it is preferable for the contents of atmospheric gas components contained in the resin pellets to become not more than 20 ppm of $N_2$, not more than 20 ppm of $O_2$, and not more than 1 ppm of $H_2O$, and furthermore for the total content of volatile components such as impurities from the synthesis and low-molecular-weight allyloxymethylstyrene type resin to become not more than 1 ppm.

The plastic magnetic recording medium substrate of the present invention can be obtained by carrying out injection molding using the thermoplastic allyloxymethylstyrene type resin from which volatile components contained in the resin have been thoroughly removed in advance by drying as described above. Specifically, the injection molding can be carried out using a commercially sold injection molding apparatus and a mold having a stamper fixed thereto, using a prescribed resin temperature, injection rate and clamping pressure, and moreover setting the mold temperature to a suitable temperature on each of the fixed side and the movable side. For example, the injection molding conditions can be set to a resin temperature of 360° C., an injection rate of 170 mm/s, and a clamping pressure of 70 kg/cm$^2$. Moreover, the mold temperature can be set, for example, to 150° C. on the fixed side and 150° C. on the movable side. Under such conditions, a magnetic recording medium substrate of, for example, diameter approximately 95 mm and thickness approximately 1.27 mm can be manufactured.

In particular, a thermoplastic phenylallyloxymethylstyrene resin that can be used in the present invention is a highly heat-resistant injection molding resin, having a glass transition temperature of at least 180° C., preferably at least 200° C., and a high thermal decomposition point of at least 360° C. The resin temperature and the mold temperature can thus be set higher than with conventional thermoplastic injection molding resins. Moreover, a thermoplastic allyloxymethylstyrene resin that is suitable for the present invention does not have a particularly high glass transition temperature, but is a highly heat-resistant injection molding resin, having a sufficiently high thermal decomposition point of at least 350° C. The resin temperature during the injection molding can thus be set higher than with conventional thermoplastic injection molding resins. In general, the injection molding resin can be pulverized and melted using a screw at 250 to 380° C. in an injection heating tube, and can be injected into the mold cavity. The resin can be then made to flow and thus fill up the mold cavity from an inner periphery thereof toward an outer periphery thereof, and then cooled and thus hardened from the surface of the mold, whereby the resin is molded into a magnetic recording medium substrate. Consequently, the higher the thermal decomposition point of the thermoplastic resin used, the higher the resin temperature in the heating tube can be set, and moreover the higher the glass transition temperature (Tg), the higher the mold temperature can be set. The higher the resin temperature and the higher the mold temperature, the lower the melt viscosity of the resin injected into the mold cavity can be kept, and hence with the resin of the present invention the magnetic recording medium substrate can be molded with the fluidity higher than with a conventional resin.

A magnetic recording medium substrate molded from such a highly fluid state has an extremely high surface precision. For example, a magnetic recording medium substrate having a sufficient surface precision, i.e., a flatness in the radial direction of the substrate surface of not more than 12 μm, a straightness of not more than 1.2 μm, a waviness (Wa) of not more than 50 nm, and an average roughness (Ra) of not more than 0.5 nm, can be obtained.

A description will now be give of a magnetic recording medium according to the present invention. The magnetic recording medium of the present invention uses the magnetic recording medium substrate manufactured by injection molding using an allyloxymethylstyrene type resin as described above. In the present invention, it is preferable to use a thermoplastic phenylallyloxymethylstyrene or allyloxymethylstyrene resin. In the following description, thermoplastic phenylallyloxymethylstyrene or allyloxymethylstyrene resins are exemplified, but the present invention is not limited thereto.

Referring to FIG. 1, which shows a schematic sectional view of the structure of the magnetic recording medium of the present invention, in the present invention, a plastic substrate obtained by drying and injection molding a thermoplastic phenylallyloxymethylstyrene resin or a thermoplastic allyloxymethylstyrene resin using the method described earlier is used as a substrate 1. An intermediate layer 2, a non-magnetic foundation layer 3, a magnetic layer 4, a protective layer 5, and a liquid lubricant layer 6 are formed in this order thereon, thus producing the magnetic recording medium. Materials used from hitherto can be used for the intermediate layer 2, the non-magnetic foundation layer 3, the magnetic layer 4, the protective layer 5, and the liquid lubricant layer 6. Specifically, the intermediate layer 2 is a metallic layer made, for example, of Ti, the non-magnetic foundation layer 3 is a foundation layer made, for example, of Cr, the magnetic layer 4 is made of a Co alloy, for example a ferromagnetic alloy such as Co—Cr—Pt or Co—Cr—Ta. The protective layer 5 is, for example, a carbon protective layer or the like, and the liquid lubricant layer 6 is made of a fluorinated lubricant such as a perfluoropolyether lubricant or the like.

The magnetic recording medium of the present invention has been described using FIG. 1, but this structure is merely one example, and various modifications can be made in accordance with the purpose of the magnetic recording medium. For example, in the present invention, the intermediate layer 2 need not be provided. Moreover, there are no particular limitations on the shape, which can be matched to the apparatus in which the magnetic recording medium of the present invention is to be used. For example, the magnetic recording medium can be a disk shape if used in an HDD.

Such a magnetic recording medium that uses a plastic substrate obtained by injection molding a thermoplastic phenylallyloxymethylstyrene resin or a thermoplastic allyloxymethylstyrene resin as described above possesses high shape stability to heat, which could not be realized with magnetic recording media that have used plastic substrates obtained using other thermoplastic resins.

It is known that in general a plastic substrate obtained by injection molding can undergo shape change, particularly under a high-temperature environment, due to the effects of residual stress that has arisen in the substrate during the injection molding. This residual stress arises through the following phenomenon. During the filling of the resin during the injection molding, a temperature gradient arises between resin that has been cooled and has hardened at the mold surface (the surface side of the substrate) and resin that flows at high temperature through a central part of the cavity (the bulk of the substrate), and accompanying this a velocity gradient arises in the resin. At this time, shear stress acts at the interface between the surface side of the substrate and the mold, and hence molecules entangled with one another are extended in the direction of flow (the radial direction), and then subsequently during cooling, solidification occurs without these molecules orientating. On the other hand, in the central part of the cavity (the bulk of the substrate), there is little gradient in the temperature or velocity, and hence the molecules orient well in the direction of flow of the resin (the radial direction). The larger the difference in the orientability between the skin layer at the substrate surface and the bulk, the worse the creep properties in the thickness direction of the substrate become, and the more residual stress arises near the substrate surface. If such a magnetic disk substrate having a large residual stress is left in a high-temperature high-humidity environment (e.g. 80° C., 80% RH), then with the effects of the humidity also playing a part, deformation of the substrate will further increase, and it will become impossible to maintain the shape stability required of a magnetic disk substrate.

In view of the phenomenon described above, it is preferable to prevent as much as possible a difference arising in the orientability of the resin molecules between the skin layer at the substrate surface and the bulk. That is, to improve the shape stability of a magnetic recording medium that uses a plastic substrate, it is preferable to manufacture the magnetic recording medium using a substrate that uses a plastic material possessing a suitable structure and physical properties and that has been molded under suitable molding conditions. In particular, with a magnetic recording medium substrate manufactured in this way, there is very little residual stress at the substrate surface, and even under high temperature and high humidity, for example 80° C. and 80% RH, the amount of shape change is kept down to not more than 10%. With the present invention, it was discovered that by using such a plastic substrate, a magnetic recording medium having excellent properties can be obtained.

Here, a suitable structure is a rigid three-dimensional chemical structure having cyclic structures, and suitable physical properties means having a high glass transition temperature (high Tg), which is closely related to mechanical strength properties, and a high thermal stability (a high thermal decomposition point), which enables molding with high fluidity, and furthermore also having low hygroscopicity, with there being little swelling or change in shape due to moisture absorption. The thermoplastic resins described above used in the present invention satisfy these conditions. Specifically, for example a thermoplastic phenylallyloxymethylstyrene resin of the present invention, which has a high glass transition temperature of 180° C. to 270° C., preferably 200° C. to 270° C., a high thermal decomposition point of at least 360° C., and a low water absorption of not more than 0.01%, satisfies the conditions, and hence such a resin is desirable in the present invention. Moreover, suitable molding conditions are high-fluidity molding conditions that enable the occurrence of residual stress to be suppressed. Specifically, suitable molding conditions are molding conditions as described earlier in which the resin melting temperature is high and the mold temperature is high.

Next, a description will be given of a method of manufacturing a magnetic recording medium of the present invention. The manufacturing method of the present invention comprises a step of drying a thermoplastic allyloxymethylstyrene type resin, a step of injection molding the dried thermoplastic allyloxymethylstyrene type resin to form a plastic magnetic recording medium substrate, and a film formation step of forming at least a magnetic layer, a protective layer, and a liquid lubricant layer in this order on the plastic magnetic recording medium substrate.

In the method of manufacturing a magnetic recording medium of the present invention, the magnetic recording medium substrate is manufactured using an allyloxymethylstyrene type resin as described above, and then the magnetic recording medium is manufactured using this substrate. In the manufacturing method of the present invention, a thermoplastic allyloxymethylstyrene type resin as described earlier is used. In the manufacturing method of the present invention, it is preferable to use a thermoplastic phenylallyloxymethylstyrene resin or a thermoplastic allyloxymethylstyrene resin. In the following description, the case of using a thermoplastic phenylallyloxymethylstyrene resin or a thermoplastic allyloxymethylstyrene resin is taken as an example, but the present invention is not limited thereto.

In the manufacturing method of the present invention, the step of drying the thermoplastic phenylallyloxymethylstyrene resin or thermoplastic allyloxymethylstyrene resin, and the step of forming the plastic magnetic recording medium substrate, are carried out using a drying method and an injection molding method as described earlier. In the following, an outline description of the method of synthesizing the thermoplastic phenylallyloxymethylstyrene resin or thermoplastic allyloxymethylstyrene resin, and a description of the film formation step will thus be given.

Following is an outline description of the method of synthesizing the thermoplastic phenylallyloxymethylstyrene resin. A phenylallyloxymethylstyrene monomer can be obtained by mixing, for example, tetra-n-butylammonium bromide as a phase transfer catalyst with 2 parts by weight of $\alpha$-hydroxymethylstyrene and 1 part by weight of $\alpha$-bromomethylstyrene, and using a halogenated hydrocarbon solvent such as dichloromethane and an aqueous solvent such as water, reacting for 50 hours or more at a constant temperature under basic conditions. The phenylallyloxymethylstyrene monomer is then obtained from the product obtained by separation and purification.

Examples of other phase transfer catalysts that can be used in the synthesis of the phenylallyloxymethylstyrene monomer include tetra-n-butylammonium chloride, a crown ether plus KCl, and a crown ether plus KBr. Examples of the crown ether include 18-crown-6, tribenzo-18-crown-6, dicyclohexyl-18-crown-6, and dibenzo-18-crown-6.

The polymerization of the phenylallyloxymethylstyrene monomer to obtain the thermoplastic phenylallyloxymethylstyrene resin can be carried out as follows. A prescribed amount of the phenylallyloxymethylstyrene monomer and a polymerization initiator such as 2,2'-azobisisobutyronitrile or cumene hydroperoxide are mixed together in a polymerization tube, and after sealing the tube under a nitrogen atmosphere, or after repeating the operation freezing-deaeration-melting several times for a prescribed time and sealing the tube under a vacuum, polymerization is carried out by standing for several hours at a prescribed temperature, after which rapid cooling is carried out to form the thermoplastic phenylallyloxymethylstyrene resin. The reaction can be carried out without a solvent. The resin obtained can be precipitated by putting in methanol as a precipitant, and then isolated by filtration or the like. Other polymerization initiators that can be used in the polymerization to obtain the thermoplastic phenylallyloxymethylstyrene resin are azo compounds and peroxides. Specifically, examples of azo compounds are 2,2'-azo-bis-2-methylbutyronitrile, 2,2'-azo-bis-2-methylvaleronitrile, 2,2'-azo-bis-2,3-dimethylbutyronitrile, 2,2'-azo-bis-2-methylhexanenitrile, 2,2'-azo-bis-2,4-dimethylvaleronitrile, 2,2'-azo-bis-2,3,3-trimethylbutyronitrile, 2,2'-azo-bis-2-methylheptanenitrile, 2,2'-azo-bis-2-cyclopropylpropionitrile, 2,2'-azo-bis-2-cyclopentylpropionitrile, 2,2'-azo-bis-2-benzylpropionitrile, 2,2'-azo-bis-2-(4-nitrobenzyl)propionitrile, 2,2'-azo-bis-2-cyclobutylpropionitrile, 2,2'-azo-bis-2-cyclohexylpropionitrile, 2,2'-azo-bis-2-(4-chlorobenzyl)propionitrile, 2,2'-azo-bis-2-ethyl-3-methylvaleronitrile, 2,2'-azo-bis-2-isopropyl-3-methylvaleronitrile, 2,2'-azo-bis-2-isobutyl-4-methylvaleronitrile, 1,1'-azo-bis-1-cyclohexanenitrile, 1,1'-azo-bis-1-cyclobutanenitrile, 2,2'-azo-bis-2-carbomethoxypropionitrile, and 2,2'-azo-bis-2-carboethoxypropionitrile. Examples of peroxides are methyl ethyl ketone peroxide, cyclohexanone peroxide, bis-(1-oxycyclohexyl) peroxide, acetyl peroxide, caprylyl peroxide, lauroyl peroxide, stearoyl peroxide, benzoyl peroxide, p,p'-dichloro-benzoyl peroxide, (2,4,2',4'-tetrachloro)benzoyl peroxide, di-t-butyl peroxide, di-t-amyl peroxide, t-butyl cumyl peroxide, dicumyl peroxide, 2,5-dimethyl-2,5-di(t-butyl-peroxy)hexane, t-butyl hydroperoxide, p-menthane hydroperoxide, 2,5-dimethyl-2,5-dihydroperoxy hexane, cumene hydroperoxide, t-butyl peracetate, t-butyl perisobutyrate, t-butyl perpivalate, t-butyl perbenzoate, di-t-butyl perphthalate, 2,5-dimethyl(2,5-benzoylperoxy)hexane, t-butyl permaleate, i-propyl percarbonate, t-butylperoxy-1-propyl carbonate, and succinic peroxide.

Next, an outline description will be given of the method of synthesizing the thermoplastic allyloxymethylstyrene resin of the present invention. An allyloxymethylstyrene monomer can be obtained by mixing, for example, tetra-n-butylammonium bromide as a phase transfer catalyst with 1 part by weight of $\alpha$-hydroxymethylstyrene and 10 parts by weight of allyl bromide, and using a halogenated hydrocarbon solvent such as dichloromethane and an aqueous solvent such as water, reacting for 50 hours or more at a constant temperature under basic conditions. The allyloxymethylstyrene monomer is then obtained from the product obtained by separation and purification. Note that examples of phase transfer catalysts that can be used in the synthesis of the allyloxymethylstyrene monomer are the same as those given earlier in the method of synthesizing the phenylallyloxymethylstyrene monomer.

The polymerization of the allyloxymethylstyrene monomer to obtain the thermoplastic allyloxymethylstyrene resin can be carried out as follows. A prescribed amount of the allyloxymethylstyrene monomer and a polymerization initiator such as 2,2'-azobisisobutyronitrile or cumene hydroperoxide are mixed together in a polymerization tube, and after sealing the tube under a nitrogen atmosphere, or after repeating the operation freezing-deaeration-melting several times for a prescribed time and sealing the tube under a vacuum, polymerization is carried out by standing for several hours at a prescribed temperature, after which rapid cooling is carried out, whereby the thermoplastic allyloxymethylstyrene resin can be obtained. The reaction can be carried out without a solvent. The resin obtained can be precipitated by putting in methanol as a precipitant, and then isolated by filtration or the like. Note that examples of polymerization initiators that can be used in the synthesis of the thermoplastic allyloxymethylstyrene resin are the same as those given earlier in the method of synthesizing the thermoplastic phenylallyloxymethylstyrene resin.

In the step of building up a layered structure enabling magnetic recording on an upper surface of the plastic magnetic recording medium substrate (the film formation step), an intermediate layer 2 is formed on the substrate by sputtering, then a non-magnetic foundation layer 3 is formed on the intermediate layer 2, and then a magnetic layer 4 and a protective layer 5 are formed thereon in this order. After that, a lubricant that has been diluted with a solvent is applied onto the surface of the protective layer 5. It is preferable for the non-magnetic foundation layer 3 to be a Cr layer, and for the magnetic layer 4 to be a Co-14Cr-4Ta alloy layer.

When, for example, the non-magnetic foundation layer 3, the magnetic layer 4, and the protective layer 5 are a Cr non-magnetic foundation layer, a Co-14Cr-4Ta magnetic alloy layer, and a carbon layer respectively, these layers can be formed by sputtering. Moreover, when the protective layer 5 is a carbon protective layer, this layer can be an ordinary carbon protective layer composed primarily of graphite or a DLC protective layer, and nitrogen can be added to the carbon protective layer. Moreover, the lubricant layer 6 can be applied by dip coating, spin coating or the like, and a perfluoropolyether can be favorably used as the lubricant, with ZDOL and AM2001 made by Ausimont and DEMNUM-SA and DEMNUM-SP made by Daikin Industries, Ltd. being particularly preferable.

The thicknesses of the intermediate layer 2, the non-magnetic foundation layer 3, the magnetic layer 4, the protective layer 5, and the lubricant layer 6 can be the same as used in conventional magnetic recording media. Note that the present invention is not limited to the constitution described above. For example, in the present invention, the intermediate layer 2 need not be provided.

Following is a more detailed description of the present invention through examples. In Preparation Example 1, the synthesis of phenylallyloxymethylstyrene monomer is formed by mixing together 193 g (1 mol) of α-bromomethylstyrene, 262 g (2 mol) of α-hydroxymethylstyrene, 1000 ml of dichloromethane, and 15 g of tetra-n-butylammonium bromide while cooling in an ice bath. A solution of 140 g (3.5 mol) of sodium hydroxide in 1000 ml of water was instilled therein, and reaction was carried out for 50 hours while stirring vigorously, after which the aqueous layer was washed with dichloromethane. The dichloromethane was removed, and reduced pressure distillation was carried out at 140° C. and 0.4 mmHg to obtain 100 g of product A. The product obtained is a mixture, and hence separation and purification were carried out by column chromatography using a hexane/dichloromethane developing liquid, thus obtaining the phenylallyloxymethylstyrene monomer.

In Preparation Example 2 synthesis of phenylallyloxymethylstyrene polymer (Resin 1) is formed by obtaining 100 ml of the phenylallyloxymethylstyrene monomer obtained in Preparation Example 1, and 0.006 mol of the polymerization initiator 2,2'-azobisisobutyronitrile (AIBN) were put into a PYREX glass polymerization tube, and after sealing the tube under a nitrogen atmosphere, or after carrying out the operation freezing-deaeration-melting 3 times for 30 min, 40 min, and 50 min and sealing the tube under a vacuum, polymerization was carried out by leaving for 24 hours in a constant temperature bath at 60° C. The polymerization was stopped by rapidly cooling the polymerization tube in ice. After that, methanol was put in as a precipitant, whereby a white powdery polymer was obtained. The precipitated polymer was filtered off using a glass filter, the methanol was removed, and drying was carried out for at least 48 hours in a vacuum dryer, thus obtaining a phenylallyloxymethylstyrene polymer (resin 1). From the ratio of the absorption strength of phenyl protons and the absorption strength of pendant olefin detected in the $^1$H-NMR spectrum of the polymer obtained, the cyclization rate for the resin 1 was determined to be 90%. Moreover, the glass transition temperature (Tg) determined from DSC analysis was 220° C., and the thermal decomposition point determined from TG analysis was 360° C. Furthermore, the moisture content in the polymer was determined to be 0.008% from TDS analysis. The molecular weight was measured using gel permeation chromatography (GPC), whereupon the number average molecular weight (Mn) was 14,000. The polymer was a copolymer having repeat units represented by general formulae 1 and 2.

Note that in the measurement of the thermal decomposition point, the 0.5% thermal weight loss temperature as measured using a thermogravimetric analyzer was taken as the thermal decomposition point. The measurement conditions were as follows. Measuring device: Thermogravimetric analyzer ('TG/DTA220' made by Seiko Instruments Inc.), weight of sample: 5±0.5 mg, $N_2$ flow rate: 200 ml/min, measurement temperature: 30 to 600° C., and heating rate: 10° C./min.

Phenylallyloxymethylstyrene polymers (resin 2 and resin 3) were prepared following Preparation Example 2, but with differences in the manufacturing conditions as shown in Table 1.

TABLE 1

PROPERTIES OF RESIN

| | Resin | | | | |
|---|---|---|---|---|---|
| | 1 | 2 | 3 | 4 | 5 |
| Polymerization Reaction Temperature and Time | 60° C. 24 hr | 120° C. 24 hr | 140° C. 9 hr | 60° C. 24 hr | 120° C. 24 hr |
| Polymerization Initiator[a] | AIBN | CHP | CHP | AIBN | CHP |
| Cyclization Rate (%) | 90 | 96 | 99 | 88 | 96 |
| Tg (° C.) | 220 | 250 | 265 | 110 | 100 |
| Thermal Decomposition Point (° C.) | 360 | 380 | 400 | 350 | 370 |
| Moisture Content (%) | 0.008 | 0.008 | 0.008 | 0.006 | 0.006 |
| Number Average Molecular Weight (Mn) | 14000 | 18100 | 12700 | 5500 | 3000 |

[a]AIBN: 2,2'-azobisisobutyronitrile; CHP: cumene hydroperoxide

The properties for resins 1, 2, and 3 are shown in Table 1. For resin 2 and resin 3, the cyclization rate, Tg, the thermal decomposition point, and the moisture content were measured as in Preparation Example 2 described above.

In Preparation Example 3, synthesis of allyloxymethylstyrene monomer was formed by mixing together 233 g (1.9 mol) of allyl bromide, 26 g (0.2 mol) of α-hydroxymethylstyrene, 1000 ml of dichloromethane, 3.4 g (0.01 mol) of tetra-n-butylammonium bromide, and 290 ml of water, and a sodium hydroxide aqueous solution having 39 g of sodium hydroxide dissolved therein was mixed into the mixture, and reaction was carried out by heating and refluxing at 50° C. for 50 hours. After the reaction, the aqueous layer and the organic layer were separated, and the aqueous layer was subjected to ether extraction, and then the ether layer and the organic layer were mixed together, and drying was carried out overnight with magnesium sulfate. After filtering off the drying agent, the ether was distilled off, and then the residual liquid was distilled at 54° C. under a reduced pressure of 0.2 mmHg to obtain 24 g of product B. The product was found to contain impurities, and hence separation and purification were carried out by column chromatography using a cyclohexane/chloroform developing liquid, thus obtaining the allyloxymethylstyrene monomer.

In Preparation Example 4, synthesis of allyloxymethylstyrene polymer (resin 4) was formed by obtaining 100 ml of the allyloxymethylstyrene monomer obtained in Preparation Example 3 and 0.006 mol of the polymerization initiator 2,2'-azobisisobutyronitrile (AIBN) were put into a PYREX glass polymerization tube, and after sealing the tube under a nitrogen atmosphere, or after carrying out the operation freezing-deaeration-melting 3 times for 30 min, 40 min and 50 min and sealing the tube under a vacuum, polymerization was carried out by leaving for 24 hours in a constant temperature bath at 60° C. The polymerization was stopped by rapidly cooling the polymerization tube in ice. After that, methanol was put in as a precipitant, whereby a white powdery polymer was obtained. The precipitated polymer was filtered off using a glass filter, the methanol was removed, and drying was carried out for at least 48 hours in a vacuum dryer, thus obtaining an allyloxymethylstyrene polymer (resin 4). From the ratio of the absorption strength of phenyl protons and the absorption strength of pendant olefin detected in the $^1$H-NMR spectrum of the polymer obtained, the cyclization rate was determined to be 88%. Moreover, the glass transition temperature (Tg) determined from DSC analysis was 110° C., and the thermal decomposition point determined from TG analysis was 350° C. Furthermore, the moisture content in the polymer was determined to be 0.006% from TDS analysis. The molecular weight was measured using gel permeation chromatography (GPC), whereupon the number average molecular weight (Mn) was 5,500. The polymer was a copolymer having repeat units represented by general formulae 3 and 4.

Another allyloxymethylstyrene polymer (resin 5) was prepared following the method indicated in Preparation Example 4, but with differences in the manufacturing conditions as shown in Table 1. The properties for the resins obtained (resins 4 and 5) are shown in Table 1. For resin 5, the cyclization rate, Tg, the thermal decomposition point, and the moisture content were measured as in Preparation Example 4 described above.

Working Example 1 was obtained from the thermoplastic phenylallyloxymethylstyrene resin prepared following Preparation Example 2 described above and having a cyclization rate of 90%, a glass transition temperature (Tg) of 220° C. and a thermal decomposition point of 360° C. (resin 1) was subjected to vacuum drying for 24 hours at 140° C. under a reduced pressure of not more than 20 Pa, and was then subjected to drying for 15 hours under normal pressure at 120° C. while purging with $N_2$, thus obtaining a dried phenylallyloxymethylstyrene resin 1 for which the contents of atmospheric gas components in the resin were not more than 20 ppm of $N_2$, not more than 20 ppm of $O_2$, and not more than 1 ppm of $H_2O$, and furthermore the total content of volatile components such as impurities from the synthesis and low-molecular-weight phenylallyloxymethylstyrene resin was not more than 1 ppm.

Next, using this thoroughly dried resin, a magnetic recording medium substrate I of diameter approximately 90 mm and thickness approximately 1.27 mm was obtained by injection molding using a commercially sold injection molding apparatus having a maximum injection molding pressure of 70 t. The injection molding was carried out using a mold having a stamper fixed thereto with the above-mentioned injection molding apparatus, and with injection molding conditions of a resin temperature of 360° C., an injection rate of 170 mm/s, a clamping pressure of 70 kg/cm$^2$, and a mold temperature of 150° C. on the fixed side and 150° C. on the movable side.

Working Example 2 was obtained by drying and then injection molding as carried out in Working Example 1, except that the thermoplastic phenylallyloxymethylstyrene resin 2 having a cyclization rate of 96%, a glass transition temperature (Tg) of 250° C. and a thermal decomposition point of 380° C. was used, thus obtaining a magnetic recording medium substrate II.

Working Example 3 was obtained by drying and then injection molding as carried out in Working Example 1, except that the thermoplastic phenylallyloxymethylstyrene resin 3 having a cyclization rate of 99%, a glass transition temperature (Tg) of 265° C. and a thermal decomposition point of 400° C. was used, thus obtaining a magnetic recording medium substrate III.

Working Example 4 was obtained using the thermoplastic allyloxymethylstyrene resin 4 having a cyclization rate of 88%, a glass transition temperature (Tg) of 110° C. and a thermal decomposition point of 350° C. was subjected to vacuum drying for 24 hours at 140° C. under a reduced pressure of not more than 20 Pa, and was then subjected to drying for 15 hours under normal pressure at 120° C. while purging with $N_2$, thus obtaining a dried allyloxymethylstyrene resin 4 for which the contents of atmospheric gas components in the resin were not more than 20 ppm of $N_2$, not more than 20 ppm of $O_2$, and not more than 1 ppm of $H_2O$, and furthermore the total content of volatile components such as impurities from the synthesis and low-molecular-weight allyloxymethylstyrene resin was not more than 1 ppm.

Next, using this thoroughly dried resin, a magnetic recording medium substrate IV of diameter approximately 90 mm and thickness approximately 1.27 mm was obtained by injection molding using a commercially sold injection molding apparatus having a maximum injection molding pressure of 70 t. The injection molding was carried out using a mold having a stamper fixed thereto with the above-mentioned injection molding apparatus, and with injection molding conditions of a resin temperature of 350° C., an injection rate of 170 mm/s, a clamping pressure of 70 kg/cm$^2$, and a mold temperature of 100° C. on the fixed side and 100° C. on the movable side.

Working Example 5 was obtained by drying and then injection molding as carried out in Working Example 4, except that the thermoplastic allyloxymethylstyrene resin 5 having a cyclization rate of 96%, a glass transition temperature (Tg) of 100° C. and a thermal decomposition point of 370° C. was used, thus obtaining a magnetic recording medium substrate V.

Working Example 6 was obtained by forming a Cr foundation layer of thickness 500 Å, a Co-14Cr-4Ta magnetic layer of thickness 300 Å, and a carbon protective layer of thickness 80 Å were formed in this order by DC sputtering on the magnetic recording medium substrate I obtained in Working Example 1 described above, and then the surface after the sputtering was subjected to tape burnishing, and a layer of a fluorinated lubricant (e.g., Fomblin Z-DOL made by Ausimont) was formed thereon to a thickness of 20 Å by spin coating, thus obtaining a magnetic recording medium a.

Working Example 7 is a magnetic recording medium b obtained by using the same procedure as in Working Example 6, except that the magnetic recording medium substrate obtained in Working Example 2 was used.

Working Example 8 is a magnetic recording medium c obtained by using the same procedure as in Working Example 6, except that the magnetic recording medium substrate III obtained in Working Example 3 was used.

Working Example 9 is a magnetic recording medium d obtained by using the same procedure as in Working Example 6, except that the magnetic recording medium substrate IV obtained in Working Example 4 was used.

Working Example 10 is a magnetic recording medium e obtained by using the same procedure as in Working Example 6, except that the magnetic recording medium substrate V obtained in Working Example 5 was used.

Comparative Example 1 was formed by using a commercially sold thermoplastic norbornene type resin ('Zeon EX280' made by Nippon Zeon Co., Ltd.), and resin drying and injection molding were carried out as in Working Example 1, thus obtaining a magnetic recording medium substrate VI.

Comparative Example 2 was formed by using a commercially sold thermoplastic polycarbonate resin ('Panlite AD5503' made by Teijin Chemicals Ltd.), and resin drying and injection molding were carried out as in Working Example 1, thus obtaining a magnetic recording medium substrate VII.

Comparative Example 3 is a magnetic recording medium substrate VI of Comparative Example 1 subjected to the same film formation processing as in Working Example 6, thus obtaining a magnetic recording medium f.

Comparative Example 4 is a magnetic recording medium substrate VII of Comparative Example 2 subjected to the same film formation processing as in Working Example 6, thus obtaining a magnetic recording medium g.

The flatness, and the straightness (Pa) in the radial direction of the substrate, the waviness (Wa), and the average roughness (Ra) were evaluated for the magnetic recording medium substrates produced in Working Examples 1 to 5 and Comparative Examples 1 and 2. The flatness was determined using an 'FT-12' flatness tester (made by Nidec), and the straightness, the waviness, and the roughness were determined using a 'Chapman' non-contact optical surface roughness meter (made by Chapman). The results are shown in Table 2 together with the cyclization rate, the glass transition temperature (Tg), the thermal decomposition point and the moisture content for the thermoplastic phenylallyloxymethylstyrene resins 1 to 3 and the thermoplastic allyloxymethylstyrene resins 4 and 5 used in Working Examples 1 to 5.

TABLE 2

SURFACE PRECISION OF MAGNETIC RECORDING MEDIUM SUBSTRATES

| Examples | Working Example 1 | Working Example 2 | Working Example 3 | Working Example 4 | Working Example 5 | Comp. Example 1 | Comp. Example 2 |
|---|---|---|---|---|---|---|---|
| Cyclization Rate (%) | 90 | 96 | 99 | 88 | 96 | — | — |
| Tg (° C.) | 220 | 250 | 265 | 110 | 100 | 135 | 125 |
| Thermal Decomposition Point (° C.) | 360 | 380 | 400 | 350 | 370 | 340 | 320 |
| Moisture Content (%) | 0.008 | 0.008 | 0.008 | 0.006 | 0.006 | 0.010 | 0.150 |
| Flatness ($\mu$m) | 10 | 9 | 8 | 12 | 12 | 15 | 18 |
| Straightness ($\mu$m) | 1.00 | 0.93 | 0.75 | 1.20 | 1.15 | 1.38 | 2.05 |
| Waviness Wa (nm) | 40 | 35 | 25 | 50 | 45 | 75 | 145 |
| Roughness Ra (nm) | 0.5 | 0.4 | 0.2 | 0.5 | 0.5 | 0.7 | 1.3 |

From these results, it can be seen that the magnetic recording medium substrates obtained by injection molding a thermoplastic phenylallyloxymethylstyrene resin or a thermoplastic allyloxymethylstyrene resin of the present invention (Working Examples 1 to 5) have low flatness value, straightness value, waviness, and roughness, and thus have excellent surface precision, compared with the magnetic recording medium substrates obtained by injection molding a commercially sold thermoplastic resin (Comparative Examples 1 and 2). According to the present invention, a magnetic recording medium having excellent properties can thus be obtained. This is because, regarding material properties, in contrast with the commercially sold thermoplastic resins of Comparative Examples 1 and 2, the thermoplastic phenylallyloxymethylstyrene resins and thermoplastic allyloxymethylstyrene resins of Working Examples 1 to 5 have an extremely high thermal decomposition point of at least 350° C., and are thus highly heat-resistant injection molding resins, and hence, in contrast with the conventional thermoplastic injection molding resins, magnetic recording medium substrates having sufficient surface precision and surface stability can be provided even under injection molding conditions giving high fluidity, i.e., a resin temperature of 350° C. or more. As a result, magnetic recording media having sufficient surface precision and surface stability can be obtained.

Next, the magnetic recording media using the plastic substrates obtained in Working Examples 6 to 10 and Comparative Examples 3 and 4 were exposed for 500 hours in an 80° C., 80% RH environment; the flatness before and after the exposure and the percentage change therein are shown in Table 3.

TABLE 3

PERCENTAGE CHANGE IN MAGNETIC RECORDING MEDIUM SHAPE
(UPON EXPOSURE FOR 500 HOURS AT 80° C. AND 80% RH)

| Examples | Working Example 6 | Working Example 7 | Working Example 8 | Working Example 9 | Working Example 10 | Comp. Example 3 | Comp. Example 4 |
|---|---|---|---|---|---|---|---|
| Cyclization Rate (%) | 90 | 96 | 99 | 88 | 96 | — | — |
| Tg (° C.) | 220 | 250 | 265 | 110 | 100 | 135 | 125 |
| Thermal Decomposition Point (° C.) | 360 | 380 | 400 | 350 | 370 | 340 | 320 |
| Moisture Content (%) | 0.008 | 0.008 | 0.008 | 0.006 | 0.006 | 0.010 | 0.150 |
| Flatness Before Exposure ($\mu$m) | 10 | 9 | 8 | 12 | 12 | 15 | 18 |
| Flatness After Exposure ($\mu$m) | 11.0 | 9.7 | 8.2 | 14.0 | 14.0 | 18.0 | 24.0 |
| Change (%) | 10.0 | 7.8 | 2.5 | 16.6 | 16.6 | 20.0 | 33.3 |

From these results, it can be seen that, compared with the magnetic recording media of Comparative Examples 3 and 4 each obtained using a commercially sold thermoplastic resin, the magnetic recording media of Working Examples 6 to 8 each obtained using a magnetic recording medium substrate that uses a thermoplastic phenylallyloxymethylstyrene resin of the present invention had excellent shape stability (i.e., resistance to change in shape due to the environment), with there being very little change in shape under high temperature and high humidity. According to the present invention, magnetic recording media having excellent shape stability (i.e., resistance to change in shape due to the environment) can thus be obtained. This is because, regarding material properties, in contrast with the commercially sold thermoplastic resins of Comparative Examples 1 and 2, the thermoplastic phenylallyloxymethylstyrene resins of Working Examples 1 to 3 have an extremely high glass transition temperature of at least 180° C., preferably at least 200° C., and also a high thermal decomposition point of at least 360° C., and are thus highly heat-resistant injection molding resins, and hence, in contrast with the conventional thermoplastic injection molding resins, injection molding can be carried out at high temperature, specifically with a resin temperature of 360° C. and a mold temperature of 150° C. According to the present invention, a substrate can thus be manufactured under injection molding conditions giving high fluidity such that the occurrence of residual stress in the substrate can be suppressed (i.e., such that the shape stability is excellent even upon leaving at high temperature), and thus a magnetic recording medium substrate having sufficient surface precision and shape stability can be obtained, and hence ultimately a magnetic recording medium having sufficient surface precision and shape stability can be obtained.

Furthermore, compared with the commercially sold thermoplastic resins used in Comparative Examples 1 and 2, the thermoplastic phenylallyloxymethylstyrene resins and thermoplastic allyloxymethylstyrene resins used in Working Examples 1 to 5 have an extremely low water absorption, and hence even if exposed to a high-humidity environment, there is extremely little change in the shape of the magnetic recording medium substrate due to swelling of the substrate caused by moisture absorption. A magnetic recording medium substrate having excellent shape stability can thus be obtained, and hence ultimately a magnetic recording medium having excellent shape stability can be obtained.

Moreover, even among the thermoplastic phenylallyloxymethylstyrene resins of Working Examples 1 to 3 that basically have the same structure as one another, if a resin having a higher cyclization rate, a higher glass transition temperature (Tg) and a higher thermal decomposition point, i.e., a thermoplastic phenylallyloxymethylstyrene resin having better heat resistance, is used, then a magnetic recording medium substrate having yet lower flatness value, straightness value, waviness, and roughness, and hence yet better surface precision, can be obtained, and as a result a magnetic recording medium for which there is extremely little change in shape even upon exposure to a high-temperature high-humidity environment can be obtained.

A thermoplastic injection molding resin for obtaining a magnetic recording medium substrate having a flatness of not more than 12 $\mu$m, a straightness in the substrate surface radial direction of not more than 1.2 $\mu$m, a waviness (Wa) of not more than 50 $\mu$m, and an average roughness (Ra) of not more than 0.5 nm, i.e., what can be said to be sufficient surface precision for a magnetic recording medium substrate, can thus be realized only through the phenylallyloxymethylstyrene resins and allyloxymethylstyrene resins of the present invention; furthermore, a thermoplastic injection molding resin for obtaining a magnetic recording medium for which the percentage change in shape upon an environmental resistance test in which the magnetic recording medium is left for 500 hours in an environment of 80° C. and 80% RH is kept down to not more than 10% can be realized through the phenylallyloxymethylstyrene resins of the present invention. That is, with the thermoplastic phenylallyloxymethylstyrene resins of the present invention, for which the structural units have a cyclic structure, which is a rigid three-dimensional chemical structure, the glass transition temperature (Tg), which is closely related to mechanical strength properties, is high, the thermal stability is high (the thermal decomposition point is high), enabling molding with high fluidity, and moreover the hygroscopicity is low, with there being little swelling or change in shape due to moisture absorption, it is possible to obtain excellent magnetic recording medium substrates and magnetic recording media.

Specifically, by using the thermoplastic phenylallyloxymethylstyrene resins of Working Examples 1 to 3, for which the cyclization rate is at least 90%, whereby the proportion of rigid three-dimensional structures in the polymer is high, and as a result in terms of physical properties the glass transition temperature (Tg) is high at 180° C. to 270° C., preferably 200° C. to 270° C., and furthermore the thermal decomposition point is high at at least 360° C., and moreover the water absorption is not more than 0.01%, excellent magnetic recording medium substrates and magnetic recording media of the present invention can be obtained.

Furthermore, with the method of manufacturing a magnetic recording medium of the present invention, it is possible to manufacture magnetic recording media having high precision and high reliability as described above in large quantities and inexpensively.

According to the present invention, a magnetic recording medium substrate and a magnetic recording medium having excellent surface properties can be provided by using a thermoplastic phenylallyloxymethylstyrene resin or a thermoplastic allyloxymethylstyrene resin.

Moreover, the magnetic recording medium substrate of the present invention, which is manufactured by injection molding a thermoplastic phenylallyloxymethylstyrene resin or allyloxymethylstyrene resin, has a high-precision surface, with there being extremely few undulating defects on the substrate surface, and with the straightness value, the waviness, the roughness and so on of the substrate surface being extremely low.

Furthermore, the magnetic recording medium of the present invention has high reliability, having excellent stability to the environment, with there being little change in shape even upon exposing for 500 hours to a high-temperature high-humidity environment of 80° C. and 80% RH.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP 2002-331198 in its entirety, including the drawings, claims, and the specification thereof, is incorporated herein by reference.

What is claimed is:

1. An injection molded plastic magnetic recording medium substrate comprising a thermoplastic allyloxymethylstyrene resin having a cyclization rate of at least 90% and having either or both of a structural unit represented by general formula A and a structural unit represented by general formula B,

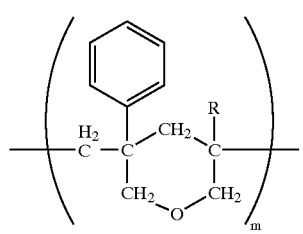

General formula A

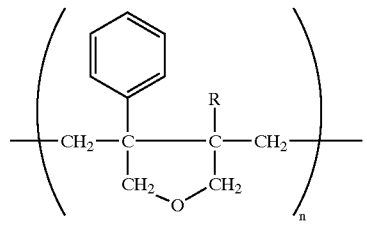

General formula B where R is a group selected from hydrogen, alkyl groups, cycloalkyl groups, aryl groups and aromatic heterocyclic groups, and m and n each represent 0 or an integer of 1 or higher, with the proviso that m and n are not both 0.

2. The injection molded plastic magnetic recording medium substrate according to claim 1, wherein the thermoplastic allyloxymethylstyrene resin includes a thermoplastic phenylallyloxymethylstyrene resin having either or both of a structural unit represented by general formula 1 and a structural unit represented by general formula 2,

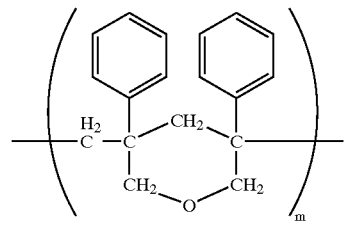

General formula 1

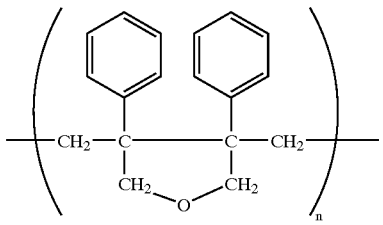

General formula 2 where m and n each represent 0 or an integer of 1 or higher, with the proviso that m and n are not both 0.

3. The magnetic recording medium substrate according to claim 2, wherein the thermoplastic phenylallyloxymethylstyrene resin has a glass transition temperature (Tg) in a range of 180° C. to 270° C., a thermal decomposition point of at least 360° C., and a moisture content of not more than 0.01%.

4. The magnetic recording medium substrate according to claim 3, wherein a substrate flatness shape change after exposure for 500 hours to a high-temperature high-humidity environment of 80° C. and 80% RH is not more than 10%.

5. The magnetic recording medium substrate according to claim 2, wherein a flatness in a substrate surface radial direction is not more than 12 μm, a straightness is not more than 1.2 μm, a waviness (Wa) is not more than 50 nm, and an average roughness (Ra) is not more than 0.5 nm.

6. The magnetic recording medium substrate according to claim 2, wherein a substrate flatness shape change after exposure for 500 hours to a high-temperature high-humidity environment of 80° C. and 80% RH is not more than 10%.

7. A magnetic recording medium comprising the substrate according to claim 2 and at least a magnetic layer, a protective layer, and a lubricant layer formed on the substrate.

8. The magnetic recording medium according to claim 7, wherein a flatness in a substrate surface radial direction is not more than 12 μm, a straightness is not more than 1.2 μm, a waviness (Wa) is not more than 50 nm, and an average roughness (Ra) is not more than 0.5 nm.

9. The magnetic recording medium according to claim 7, wherein a substrate flatness shape change after exposure for 500 hours to a high-temperature high-humidity environment of 80° C. and 80% RH is not more than 10%.

10. A method of manufacturing a magnetic recording medium comprising the steps of:
forming the injection molded plastic magnetic recording medium substrate according to claim 2 by thoroughly drying the thermoplastic phenylallyloxymethylstyrene resin and then injection molding the thermoplastic phenylallyloxymethylstyrene resin; and
forming at least a magnetic layer, a protective layer, and a lubricant layer in this order on the substrate.

11. The magnetic recoding medium substrate according to claim 2, wherein the thermoplastic phenylallyloxymethylstyrene resin has a thermal decomposition point of at least 360° C.

12. The magnetic recording medium substrate according to claim 2, wherein the thermoplastic phenylallyloxymethylstyrene resin has a glass transition temperature (Tg) in a range of 180° C. to 270° C.

13. The magnetic recording medium substrate according to claim 1, wherein a flatness in a substrate surface radial direction is not more than 12 μm, a straightness is not more than 1.2 μm, a waviness (Wa) is not more than 50 nm, and an average roughness (Ra) is not more than 0.5 nm.

14. The magnetic recording medium according to claim 13, wherein a substrate flatness shape change after being left for 500 hours in a high-temperature high-humidity environment of 80° C. and 80% RH is not more than 10%.

15. A magnetic recording medium comprising the substrate according to claim 1 and at least a magnetic layer, a protective layer, and a lubricant layer formed on the substrate.

16. The magnetic recording medium according to claim 15, wherein a flatness in a substrate surface radial direction is not more than 12 μm, a straightness is not more than 1.2 μm, a waviness (Wa) is not more than 50 nm, and an average roughness (Ra) is not more than 0.5 nm.

17. The magnetic recording medium according to claim 15, wherein a substrate flatness shape change after exposure for 500 hours to a high-temperature high-humidity environment of 80° C. and 80% RH is not more than 10%.

18. A method of manufacturing a magnetic recording medium comprising the steps of:
forming the injection molded plastic magnetic recording medium substrate according to claim 1 by thoroughly drying the thermoplastic allyloxymethylstyrene type resin and then injection molding the thermoplastic allyloxymethylstyrene type resin; and
forming at least a magnetic layer a protective layer, and a lubricant layer in this order on the substrate.

19. An injection molded plastic magnetic recording medium substrate comprising a thermoplastic allyloxymethylstyrene resin having a cyclization rate of at least 80% and having either or both of a structural unit represented by general formula 3 and a structural unit represented by general formula 4,

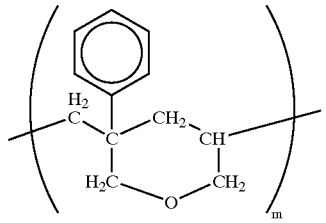

General formula 3

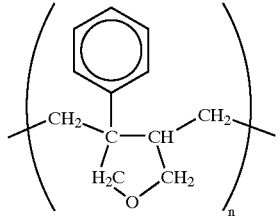

General formula 4 where m and n each represent 0 or an integer of 1 or higher, with the proviso that m and n are not both 0.

20. The magnetic recording medium substrate according to claim 19, wherein the thermoplastic allyloxymethylstyrene resin has a glass transition temperature (Tg) of at least 100° C., a thermal decomposition point of at least 350° C., and a moisture content of not more than 0.01%.

21. The magnetic recording medium substrate according to claim 19, wherein a flatness in a substrate surface radial direction is not more than 12 μm, a straightness is not more than 1.2 μm, a waviness (Wa) is not more than 50 nm, and an average roughness (Ra) is not more than 0.5 nm.

22. A magnetic recording medium comprising the substrate according to claim 19 and at least a magnetic layer, a protective layer, and a lubricant layer formed on the substrate.

23. The magnetic recording medium according to claim 22, wherein a flatness in a substrate surface radial direction is not more than 12 μm, a straightness is not more than 1.2 μm, a waviness (Wa) is not more than 50 nm, and an average roughness (Ra) is not more than 0.5 nm.

24. A method of manufacturing a magnetic recording medium comprising the steps of:
forming the injection molded plastic magnetic recording medium substrate according to claim 19 by thoroughly drying the thermoplastic allyloxymethylstyrene resin and then injection molding the thermoplastic allyloxymethylstyrene resin; and
forming at least a magnetic layer, a protective layer, and a lubricant layer in this order on the substrate.

25. The magnetic recording medium substrate according to claim 19, wherein the thermoplastic allyloxymethylstyrene resin has a thermal decomposition point of at least 350° C.

26. The magnetic recording medium substrate according to claim 19, wherein the thermoplastic allyloxymethylstyrene resin has a glass transition temperature (Tg) of at least 100° C.

* * * * *